(12) United States Patent
Drocco

(10) Patent No.: US 10,631,545 B2
(45) Date of Patent: Apr. 28, 2020

(54) SYSTEM FOR THE PREPARATION OF A MIXTURE

(71) Applicant: Sancassiano S.p.A., Roddi d'Alba (Cuneo) (IT)

(72) Inventor: Davide Drocco, Alba (IT)

(73) Assignee: SANCASSIANO S.P.A., Roddi d'Alba (Cuneo) (IT)

(*) Notice: Subject to any disclaimer, the term of this patent is extended or adjusted under 35 U.S.C. 154(b) by 555 days.

(21) Appl. No.: 15/473,158

(22) Filed: Mar. 29, 2017

(65) Prior Publication Data

US 2017/0280732 A1 Oct. 5, 2017

(30) Foreign Application Priority Data

Mar. 30, 2016 (IT) .................. 102016000032599

(51) Int. Cl.
| | | |
|---|---|---|
| *A21C 9/08* | (2006.01) | |
| *A21C 1/14* | (2006.01) | |
| *B65G 21/14* | (2006.01) | |
| *B01F 7/16* | (2006.01) | |
| *A21C 1/02* | (2006.01) | |
| *B08B 17/02* | (2006.01) | |

(52) U.S. Cl.
CPC .................. *A21C 1/14* (2013.01); *A21C 1/02* (2013.01); *A21C 9/08* (2013.01); *B01F 7/1605* (2013.01); *B65G 21/14* (2013.01); *B08B 17/02* (2013.01); *B65G 2201/0202* (2013.01)

(58) Field of Classification Search
CPC .... A21C 1/14; A21C 9/08; A21C 1/02; B01F 7/1605; B65G 21/14; B65G 2201/0202; B08B 17/02

USPC .......................................................... 366/69
See application file for complete search history.

(56) References Cited

U.S. PATENT DOCUMENTS 2,253,770 A * 8/1941 Duffy, Jr. .................. A21B 1/48
426/27
3,019,890 A * 2/1962 Knill ...................... B65G 21/10
198/309

FOREIGN PATENT DOCUMENTS

| DE | 3045867 A1 | 7/1982 |
| EP | 0042199 A1 | 12/1981 |
| EP | 0714606 A1 | 6/1996 |
| FR | 2897594 A1 | 8/2007 |

OTHER PUBLICATIONS

Machine translation of FR-2897594 A1 (Year: 2019).*
Italian Search Report dated Dec. 13, 2016, for corresponding Italian Patent Application No. IT UA20162116.

* cited by examiner

*Primary Examiner* — Huy Tram Nguyen
(74) *Attorney, Agent, or Firm* — Heslin Rothenberg Farley & Mesiti P.C.; Victor A. Cardona, Esq.

(57) ABSTRACT

A mixing system includes a mixing machine and a device for collecting material of the mixture that remains adherent to the implement of the machine, at the end of a mixing step. The collecting device has a collecting surface that is associated to movement means designed to guide the surface in a first direction and a second direction, so that this can pass, as a result of the movement in both directions, from a first condition, where the surface extends at least prevalently in the first direction, to a second condition, where the surface extends at least prevalently in the second direction.

18 Claims, 5 Drawing Sheets

SYSTEM FOR THE PREPARATION OF A MIXTURE

CROSS-REFERENCE TO RELATED APPLICATION

This application claims priority from Italian Application No. 102016000032599 filed on Mar. 30, 2016, the entire disclosure of which is incorporated herein by reference.

FIELD OF THE INVENTION

The present invention relates to a system for preparing a dough or mixture comprising a kneading or mixing machine and a device for collecting and recovering the residue of mixture that remains attached to the mixing implement or implements of the mixing machine once the mixing process has terminated.

With particular reference to the foodstuff sector, this type of device has found use in combination with mixing operations carried out by extractable-tank mixing machines. In applications with such machines, at the end of each mixing operation, the tank, together with the mixture that has been prepared, is extracted from the machine, thus leaving the mixing implement directly exposed to the outside. Whatever the type of mixture treated, a certain amount of mixture remains attached to the implements and hence by gravity starts to detach or pour.

The collecting device in question has the function of collecting this material, intercepting it as it is falling, so as to prevent the mixture from dirtying the floor around the machine, or parts of the machine, and at the same time so as to recover the mixture, thus preventing waste.

PRIOR ART

According to the prior art, the device in question is in the form of a plate or else of a conveyor mat, which is set, via an appropriate movement structure, underneath the mixing implements at the moment when the tank of the mixing machine is extracted. During the mixing step, the plate or mat is instead set at the side of the mixing machine, waiting to be used again.

A problem that is strongly felt in regard to this type of device is represented by the fact that it requires a relatively extensive space where it can be put, in view of the fact that the plate or mat referred to above has an area at least equal to the surface occupied in plan view by the mixing implements. In general, the production plants have, however, already in themselves little availability of space, and this problem is even more felt in the case of automatic production systems, in which the space around the mixing machines is occupied by the systems for movement of the tanks or else by other stations of the plant (for example, leavening stations or discharge stations).

In applications in which the limits of space are more constraining and cannot be overcome, attempts have hence been made to use collection plates or mats of smaller dimensions, which, however, have proven far from effective.

OBJECT OF THE INVENTION

In this context, the present invention proposes a solution to the drawbacks referred to above. This object is achieved via a system for the preparation of mixtures that presents the characteristics of Claim 1.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION

Figure 1:
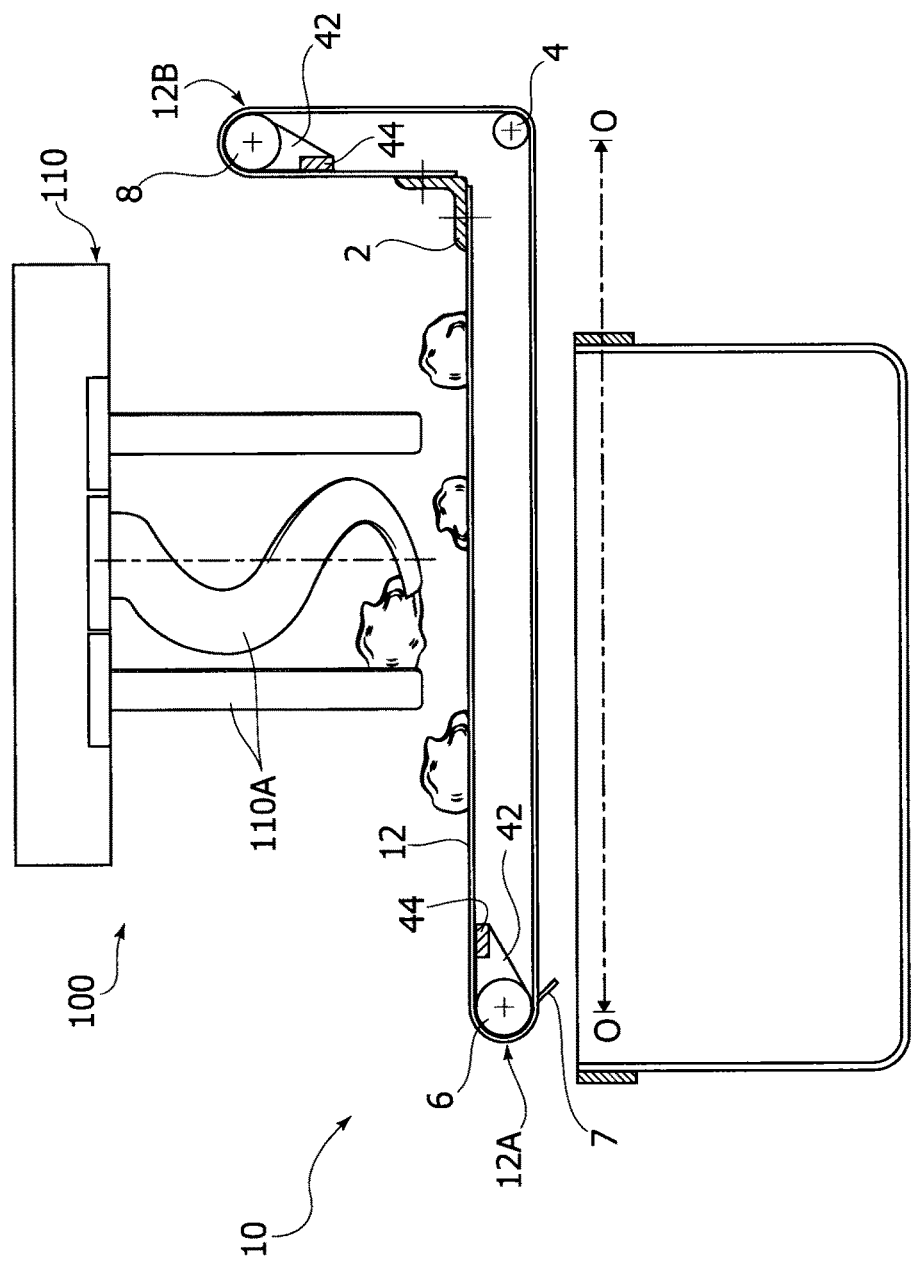
FIG. 1 is a schematic illustration of an embodiment of the system described herein, in an operative condition thereof.

In the ensuing description various specific details are illustrated aimed at enabling an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are only provided for convenience and hence do not define the sphere of protection or the scope of the embodiments.

As mentioned above, the system described herein envisages a mixing machine and, in combination therewith, a collecting device having the function of collecting the material of the mixture that remains attached to the implements of the mixing machine at the end of a mixing step.

Like the devices of a known type described at the start, the collecting device of the system described herein carries out this function by way of a collecting surface that is set underneath the mixing implements for intercepting the material of the mixture as it detaches from them as a result of gravity.

This surface is associated to means designed to move between the operative position underneath the mixing implements, and a resting position in which this surface is set while the mixing machine is carrying out a new mixing operation.

The device described herein is characterized in that the aforesaid movement means are configured for guiding the collecting surface in a first direction and in a second direction, transverse to the first direction, so that the collecting surface can pass, as a result of the movement in both of the directions indicated, from a first condition, in which the surface extends at least prevalently in the first direction, to a second condition, in which the surface extends at least prevalently in the second direction.

Assuming that the first and second directions indicated come to coincide with a horizontal direction and a vertical direction, respectively, it hence appears clear that in the device described herein the collecting surface is able to pass from an operative condition, in which it has the maximum extension in plan view, to an inoperative condition, in which it extends prevalently in the vertical direction, whilst its overall dimensions in plan view become minimum. This passage is performed by getting the surface to move only in the two mutually transverse directions referred to above; this enables the device to operate also in narrow spaces, where the free space available for movement of the device is limited.

The present applicant has found that the configuration referred to above enables solution of the problems of space associated to the known devices, and moreover enables provision of a device that is able to meet the different requirements of the various applications. In this connection, it should be noted that, in the absence of substantial limits as regards the dimensions of the collecting surface, it is possible to provide surfaces that are quite large to cover the entire area occupied by the mixing implements, but also, for example, to cover the far larger area occupied by the lids of the tanks, where present. In fact, in the cases of mixing machines that produce the mixture in a controlled environment, also the lid is covered with residue of mixture on its bottom surface, and hence the collecting surface of the device described herein may be sized so as to be able to recover also this residue. It should then be noted that, according to the type of mixing machine, there may be present various elements that carry on them residue of mixture (for example, scrapers, probes, contrast members that co-operate with the mixing implements) and the device described herein may advantageously be configured to collect the residue of mixture for each of these elements.

The device described herein has been produced by the present applicant in response to the problems encountered in the sector of foodstuff mixtures. However, it is evident that the same device may advantageously be used in any other field in which there exist the same problems.

With reference to FIGS. 1-5, a preferred embodiment of the system for preparation of mixtures described herein and of the collecting device with which it is equipped will now be described.

In the figures, the system is designated as a whole by the reference number 100 and the collecting device by the reference number 10.

The system 100 first of all comprises a kneading or mixing machine 110 of a conventional type (represented only in FIG. 1), equipped with one or more kneading or mixing implements 110A, and, preferably, with an extractable tank.

The device 10 is combined with the above machine and has a load-bearing structure, which can be either mobile or fixed and is set up against the mixing machine.

Of this structure just the beam 2 is visible in FIG. 1 in cross-sectional view.

The device 10 comprises a fixed roller 4 and two mobile rollers 6, 8, which are aligned with the roller 4 in two mutually transverse directions, in particular, in a horizontal direction in the case of the roller 6, and in a vertical direction in the case of the roller 8. The mobile rollers 6 and 8 are guided in their movement by respective guide systems, to which reference will be made in what follows.

A conveyor belt 12 is wound around the three rollers in question, and its ends are instead fixed to the bar 2. The conveyor belt 12 wound around the rollers 4, 6, and 8 identifies a horizontal branch 12A and a vertical branch 12B. As may be seen in FIG. 1, the bar 2 advantageously has an L-shaped profile, orthogonal portions of which set themselves, respectively, horizontally and vertically, so that the ends of the conveyor belt anchored thereto will be in line with the respective free parts of the conveyor belt that extend between the bar 2 and the two mobile rollers 6 and 8.

The conveyor belt 12 constitutes the collecting surface of the device. In particular, it is its horizontal branch 12A that operates to intercept the material to be collected that falls from the implements. As illustrated in FIG. 1 and as will be seen in detail in what follows, in the operative condition of the device this branch sets itself underneath the mixing implements and assumes its maximum extension.

It is to be noted that, instead of the conveyor belt, it is possible to use any other deformable plane structure that can be wound around the rollers of the device and be moved by them. For instance, it is possible to envisage structures typical of chain conveyors, i.e., structures constituted by a finite series of elements hinged together.

Figure 4:
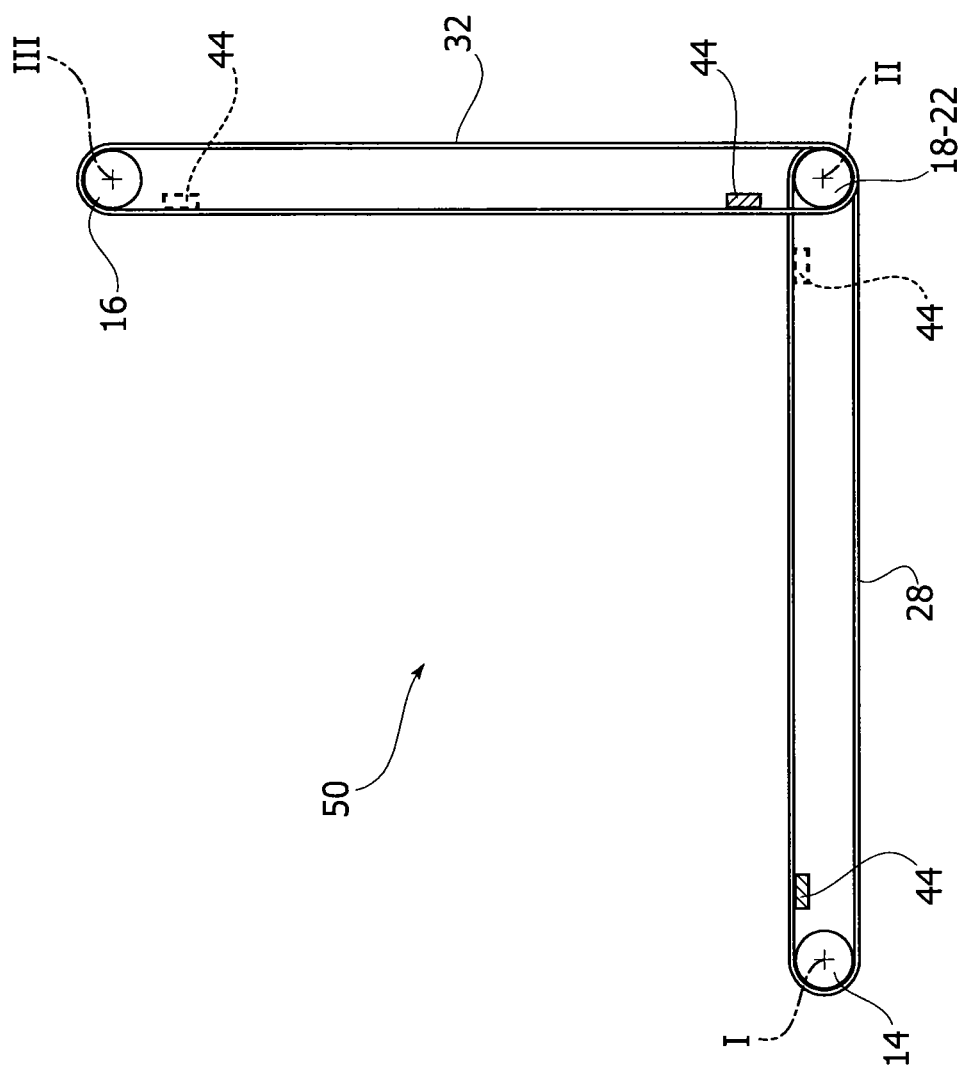
FIG. 4 is a schematic illustration in lateral view of movement means provided in the collecting device of the system FIG. 1.
Figure 5:
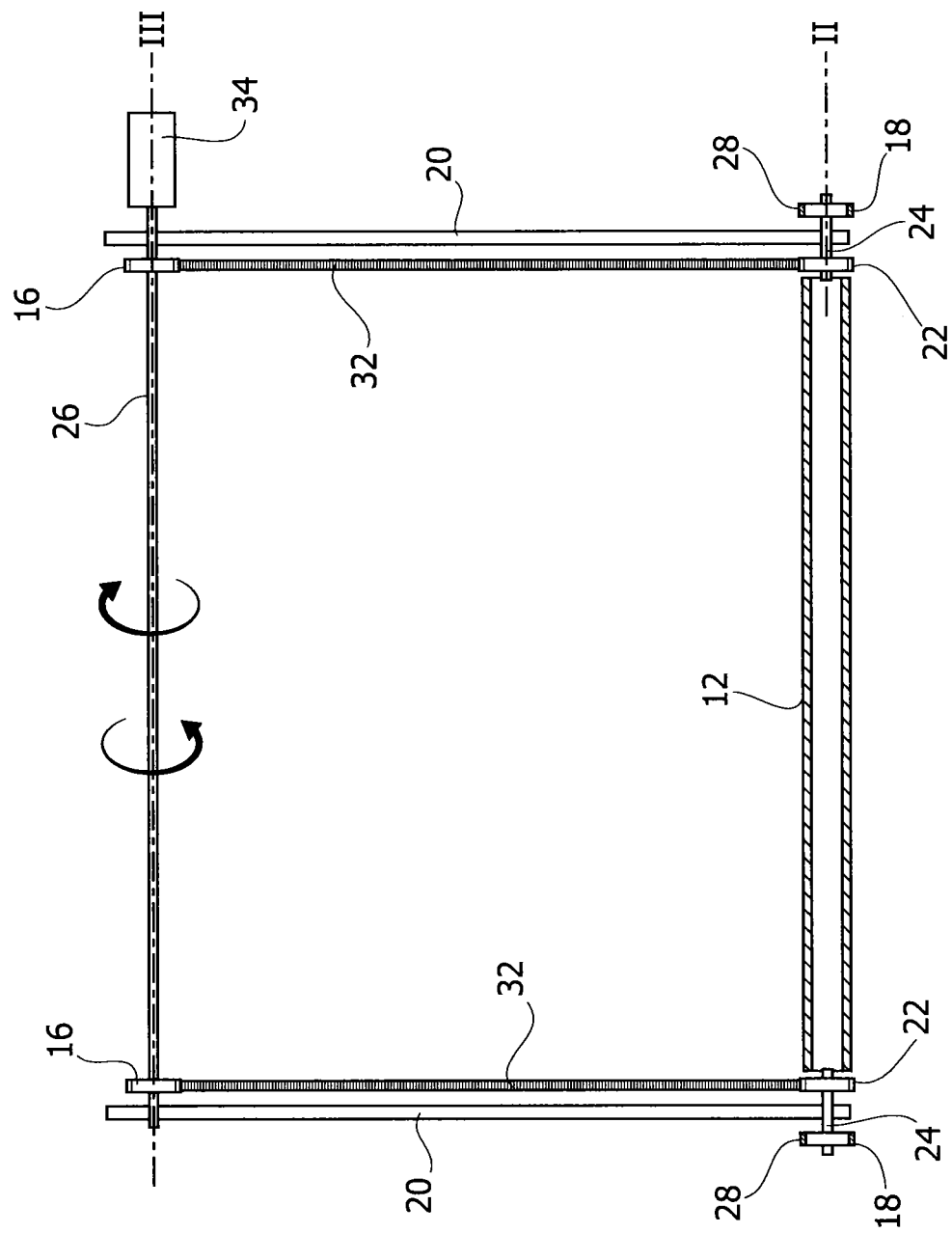
FIG. 5 illustrates a front view of the movement means illustrated in FIG. 4.

In various preferred embodiments, as in the one illustrated, the rollers 6 and 8 are moved via the belt system 50 represented in FIGS. 4 and 5.

With reference to these figures, the system comprises the three axes of rotation I, II, and III, which—as will be seen in what follows—are defined by respective rotating shafts supported by two opposed walls 20 of the fixed structure of the device. The axes I, II, and III are all three horizontal and, also in this case, like the rollers 4, 6 and 8, are mutually aligned in two different mutually transverse directions, in particular the axis I and the axis II in the horizontal direction, whilst the axis II and the axis III in the vertical direction.

Rotatably mounted about the axis I is a pair of pulley wheels 14, which are set at a distance apart from one another so as to position themselves at the outer sides of the mobile roller 6, for the reasons that will become evident in what follows. Likewise, rotatably mounted about the axis III is the pair of pulley wheels 16, which are also set at a distance apart from one another and are positioned at the outer sides of the mobile roller 8.

Rotatably mounted about the axis II are a first pair of pulley wheels 18, mutually aligned to the wheels 14 mounted about the axis I, and a second pair of pulley wheels 22, mutually aligned with the wheels 16 mounted about the axis III. As may be seen in FIG. 5, also the wheels 18 and the wheels 22 are set at a distance apart and positioned at the outer sides of the rollers 6 and 8, exactly like the pairs of wheels 14 and 16.

Once again with reference to FIG. 5, the wheels 18 and 22 of each side are carried by one and the same shaft 24, and the two opposed shafts 24 are clearly, in turn, set at a distance apart from one another and positioned at the outer sides of the rollers 6 and 8. Once again with reference to FIG. 5, one and the same shaft 26 carries instead the two wheels 16. Preferably, the wheels 14 are mounted on two distinct shafts, set at a distance apart from one another and positioned at the outer sides of the roller 6.

The system 50 further comprises a first pair of transmission belts 28, which connect the wheels 14 in rotation to the wheels 18, and moreover, a second pair of transmission belts 32, which connects the wheels 16 in rotation to the wheels 22.

A motor 34 is connected to the shaft 26 and is designed to drive of the entire system described.

In operation, the motor 34 sets in rotation, through the shaft 26, the wheels 16, which bring about movement of the belts 32. The latter set in rotation the wheels 22, and by way of the shaft 24, also the wheels 18. Rotation of the latter drives movement of the belts 28, and the latter set the wheels 14 in rotation.

The transmission belts 28 and 32 are hence moved in a synchronized way by the motor 34.

To return to FIGS. 1-3, the mobile rollers 6 and 8 are coupled to the belts 28 and 32, respectively, through supports 42, which are fixed to the belts 28 and 32 by way of anchorage members 44 provided on the supports 42 and on the belts 28 and 32. The supports 42 are guided in the movement of sliding by respective guide systems, which may be of any known type and are not hence described in detail herein. Via the supports 42 and the corresponding guide systems, the rollers 6 and 8 are hence guided in translation, respectively, along the horizontal stretch O-O and along the vertical stretch V-V.

The mutual positions spaced apart of the wheels 16, 22, 18, and 14 and of the respective shafts, which are located at the opposite sides of the rollers 6 and 8, ensure a free movement of the latter and of the conveyor belt 12, without any risk of interference with the aforesaid elements or with the supporting structures by which they are carried.

Coupling of the rollers 6 and 8 to the system of belts 50 described above is obtained according to a configuration such that, when the roller 6 is at the start of the horizontal stretch O-O, at the same time the roller 8 is at the start of the vertical stretch V-V.

Starting from this condition, movement of the belts 28 and 32 in a clockwise direction, driven by the motor 34, hence causes simultaneous movement, at the same speed, of the roller 6 and of the roller 8, the former in the horizontal direction, and the latter in the vertical direction.

The device then envisages respective end-of-travel elements for arresting the rollers 6 and 8 in respective predetermined positions after they have covered the same distance.

Accordingly, the movement of the belts 28 and 32 in a counterclockwise direction determines return of the rollers 6 and 8 into the respective starting positions referred to above, at the starts of the stretches O-O and V-V.

Figure 3:
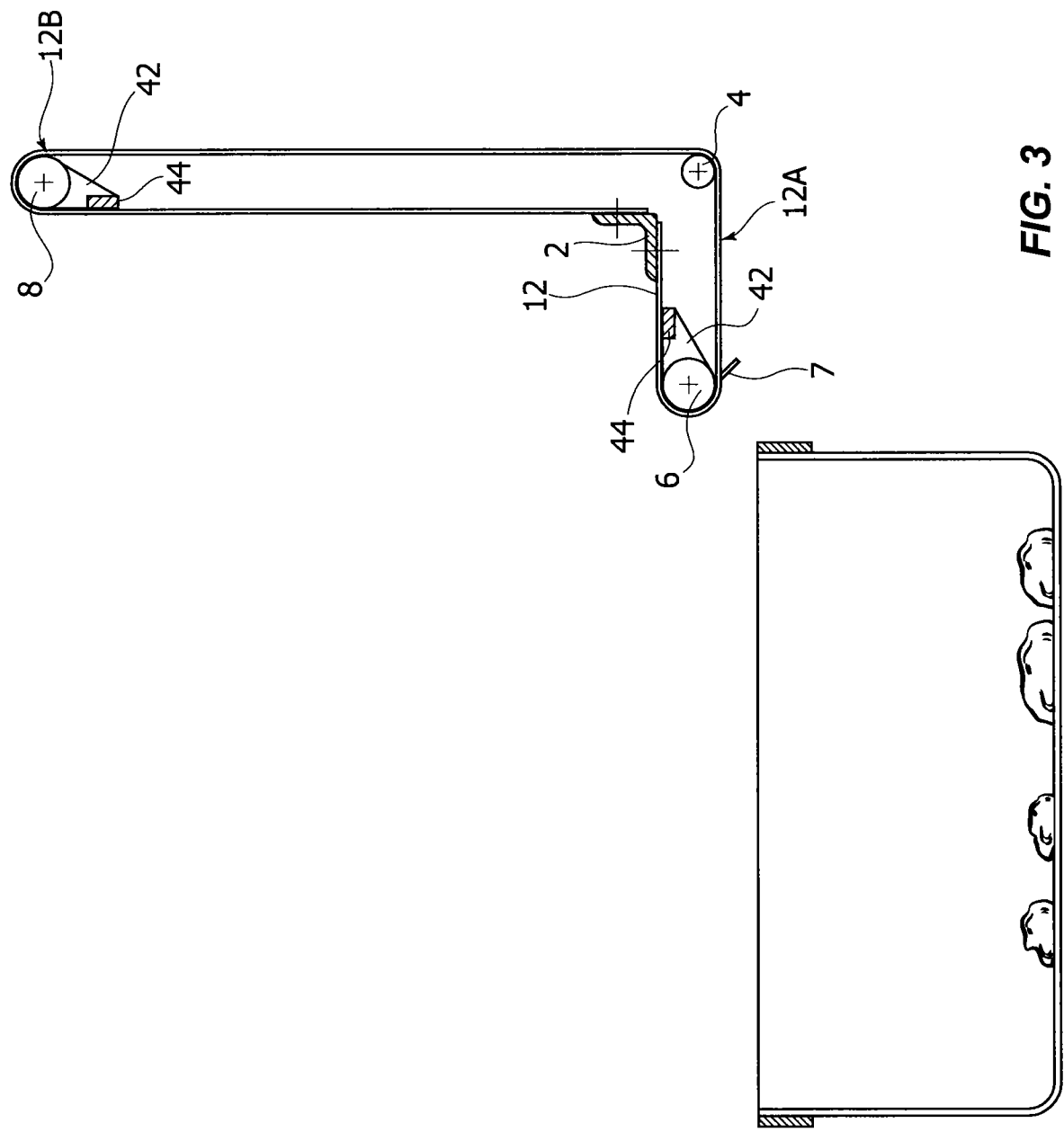
FIG. 3 illustrates the collecting device of the system of FIG. 1 set in an inoperative condition thereof.

With reference now to the conveyor belt 12, this runs around the rollers 4, 6, and 8 as a result of the synchronized movement of the two mobile rollers 6 and 8, and, in particular, by way of this movement, it is possible to pass from the configuration illustrated in FIG. 1, where, as a whole, its horizontal branch 12A has a prevalent extension, and the configuration illustrated in FIG. 3, where it is its vertical branch 12B that presents the prevalent extension.

Passage onto one or other of the two configurations is determined, in the light of what has been said above, by the direction of the movement of the belts 28 and 32, and, in the ultimate analysis, by the direction of rotation of the wheel 16 governed by the motor 34.

In particular, in the example illustrated, rotation in a clockwise direction of the wheel 16 determines movements in the same direction of the belts 28 and 32, which bring about overall displacement of the conveyor belt 12 into the configuration illustrated in FIG. 3. It will be noted that the connected movement of running of the conveyor belt 12 around the rollers 4, 6, and 8 is instead in a counterclockwise direction. Likewise, rotation in a counterclockwise direction of the wheel 16 brings about translation of the conveyor belt 12 towards the configuration of FIG. 1, and the movement of running of the conveyor belt around the rollers 4, 6 and 8 is in a clockwise direction.

With reference to the figures, it appears evident that the device 10 is hence able to pass from the configuration of FIG. 1 to the configuration of FIG. 3 via simple driving of the motor 34, and as a result of movements that occur only in the horizontal and vertical directions.

As mentioned above, the configuration of FIG. 1 represents the operative condition of the device, where it sets itself for collecting the residue of mixture that has remained on the mixing implements of the machine 110 at the end of execution of the mixing operation. As may be seen in FIG. 1, in this condition the conveyor belt 12 sets itself almost completely underneath the mixing implements.

This condition is assumed when the tank containing the mixture that has been processed is extracted from the mixing machine and until a new tank, or else the same tank after it has been emptied, is reintroduced into the machine. It may be noted that, once the new tank has been inserted in the machine, it will come to occupy a position underneath the conveyor belt 12.

At this point, the mixing machine is ready to carry out a new mixing procedure, and the device can hence move into the resting configuration illustrated in FIG. 3.

Figure 2:
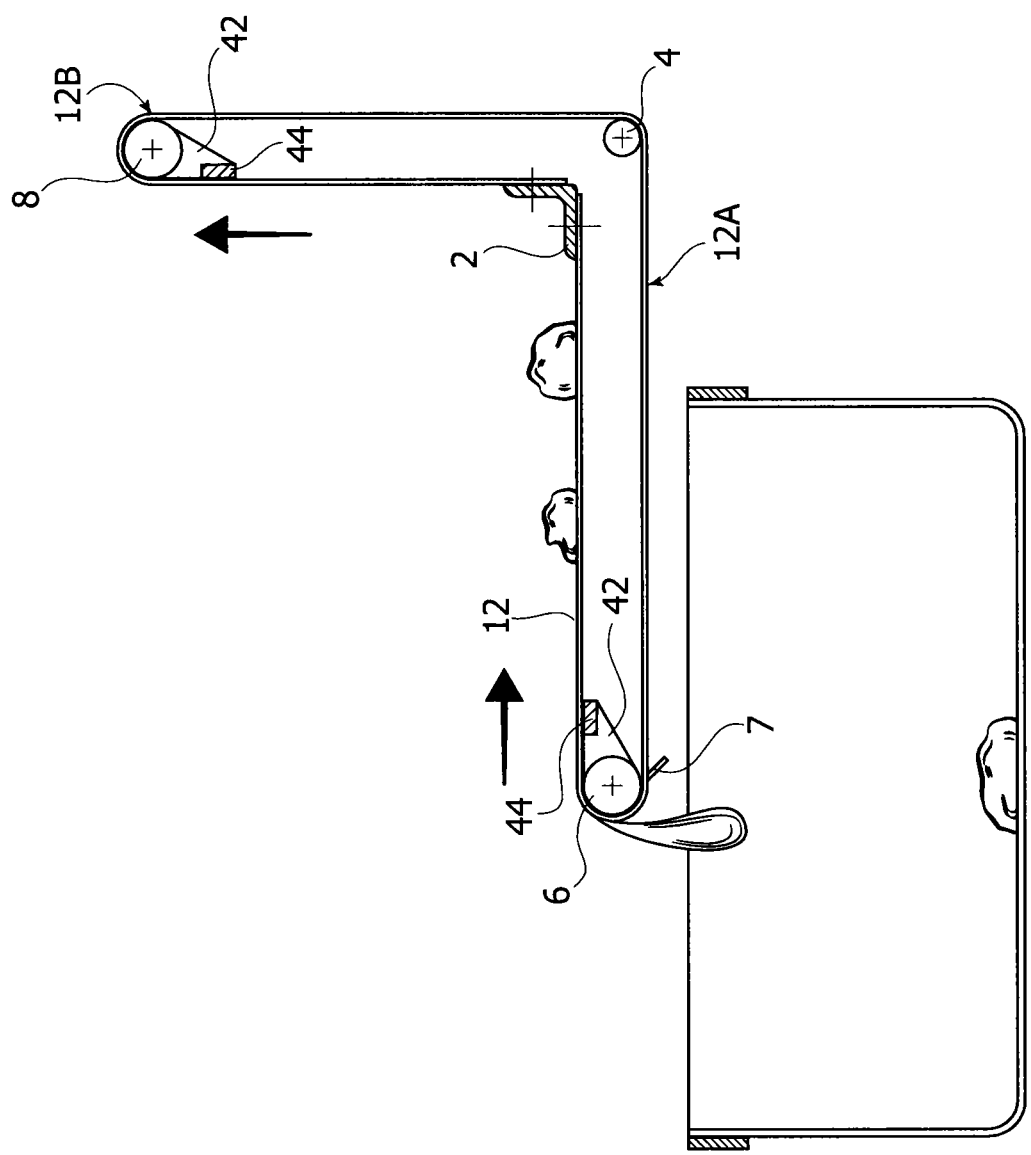
FIG. 2 illustrates the collecting device of the system of FIG. 1 during a step of discharge of the mixture gathered previously.

With reference now to FIG. 2, it may be noted that, in the passage from the configuration of FIG. 1 to the configuration of FIG. 3—as already seen above—the conveyor belt 12 follows a movement in a counterclockwise direction around the rollers 4, 6, and 8, this bringing about automatic discharge of the material of the mixture that has gathered on the conveyor belt, into the new tank.

The material of the mixture is hence immediately recovered and can be treated already in the next mixing step.

It should be noted that the device may also envisage a scraper element 7, which is carried, for example, by the same support 42 that carries the roller 6, or else by any other support connected thereto, which is designed to act on the conveyor belt 12 during its movement, in its bottom stretch downstream of the roller 6, to clean the belt and remove therefrom the material that has possibly remained still attached. Moreover, it is possible to envisage that the mobile roller 6 has a considerably reduced radial dimension (in this case, the roller being also referred to as "nose roller") so that the conveyor belt run over it will follow an accentuated curvature that is designed to favour detachment of the mixture.

When the device finally moves into the configuration of FIG. 3, the material of the mixture gathered previously is completely discharged into the tank, and the device is positioned to one side of the tank and of the mixing implements. The lateral encumbrance of the device are limited to the residual width presented by the horizontal branch 12A of the conveyor belt.

Once again with reference to FIGS. 1-3, and in particular to the mutual arrangement of the tank and of the mixing implements, it will be noted that, with a hypothetical collecting device of some other type, passage of the collecting surface from a horizontal condition to a vertical condition would not be in any way possible with conventional movement means, for example a device for tipping the surface, on account of the extremely limited space, also in a vertical direction, between the implements and the underlying tank.

In the light of the foregoing, the functions and the advantages of the device described herein as compared to collection devices of a known type consequently appear clearly.

Of course, without prejudice to the principle of the invention, the details of construction and the embodiments may vary, even significantly, with respect to what has been illustrated herein purely by way of non-limiting example, without thereby departing from the scope of the invention, as is defined by the annexed claims. In particular, the belt system 50 does not necessarily have to present a specular configuration on both of the opposite sides of the conveyor belt, but may also present a single set of wheels and belts arranged on just one of the two sides.

Moreover, the device described herein may also envisage a system of movement of the rollers 6 and 8 different from the belt system described above. For instance, the device may envisage respective linear actuators (hydraulic, pneumatic, electromagnetic cylinders, etc.) associated to the rollers 6 and 8 and governed in a co-ordinated way to obtain the synchronous movement described above of the two rollers.

The invention claimed is:

1. A system for the preparation of a mixture comprising:
   a mixing machine equipped with at least one mixing implement; and
   a device for collecting material of the mixture that remains adherent to said mixing implement at the end of a mixing step, said device comprising:
   a collecting surface movable on a first roller, a second roller and a third roller from a position of use underneath said implement to a position of non-use, said surface having a longitudinal dimension transverse with respect to a vertical direction in said position of use;
      said first roller mobile in a first direction from a first position to a second position;
      said second roller mobile in a second direction transverse to said first direction from a third position to a fourth position; and
      said third roller fixed and is substantially set at an intersection between said first direction and said second direction;
      said surface having opposite ends anchored to a supporting structure of said device such that said opposite ends are immobile;
   said surface movable on said first roller, said second roller and said third roller in said first direction and in said second direction, so that said collecting surface passes from said position of use where said surface extends at least prevalently in the first direction, to said position of non-use -where said surface extends at least prevalently in the second direction.

2. The system according to claim 1, wherein said first and second rollers are mobile along respective stretches of equal length.

3. The system according to claim 1, wherein said surface run over said rollers defines a first branch and a second branch that extend in said first direction and said second direction, respectively.

4. The system according to claim 3, wherein in said first condition said first branch has an extension greater than said second branch, whereas in said second condition it has a smaller extension.

5. The system according to claim 1, wherein said surface comprises a conveyor belt made of flexible material or else by a deformable plane structure, constituted by elements hinged together.

6. The system according to claim 1, comprising a belt system for driving a synchronized movement of said first and second rollers in said first and second directions, respectively.

7. The system according to claim 1, wherein said belt system comprises:
   a first pulley and a second pulley mounted about one and the same fixed axis of rotation, and a third pulley and a fourth pulley mounted, respectively, about a second fixed axis of rotation and a third fixed axis of rotation, which are parallel to said first axis and are set at a distance from the latter in two respective mutually transverse directions;
   a first belt mounted about said first and third pulleys, and having at least one branch mobile in said first direction; and
   a second belt mounted about said second and fourth pulleys, and having at least one branch mobile in said second direction;
   wherein said first roller is connected to the branch of said first belt mobile in said first direction; and
   wherein said second roller is connected to the branch of said second belt mobile in said second direction.

8. The system according to claim 1, comprising respective actuators of a linear type for governing the movement of said first and second rollers.

9. A method for collecting material of a mixture remaining adherent to the implement of a mixing machine at the end of a mixing step,
   wherein said method envisages the use of a collecting device comprising:
   a collecting surface movable on a first roller, a second roller and a third roller from a position of use underneath said implement to a position of non-use, said surface having a longitudinal dimension transverse with respect to a vertical direction in said position of use;
      said first roller mobile in a first direction from a first position to a second position;
      said second roller mobile in a second direction transverse to said first direction from a third position to a fourth position; and
      said third roller fixed and is substantially set at an intersection between said first direction and said second direction;
      said surface having opposite ends anchored to a supporting structure of said device such that said opposite ends are immobile;
   said method comprising the steps of:
      from said position of non-use, said collecting surface moving in said first and second directions to said position of use where said surface extends underneath said implement is reached;
      collecting the material of the mixture that detaches and falls from said implement; and
      from said position of use, said collecting surface moving in to said second position of non-use.

10. The method according to claim 9, wherein, in the passage from said first condition to said second condition, the material gathered by said collecting surface is poured into a tank containing material to be mixed, which is to undergo a new mixing operation by said mixing machine.

11. The system according to claim 2, wherein said surface has the opposite ends that are anchored to a supporting structure of said device.

12. The system according to claim 3, wherein said surface has the opposite ends that are anchored to a supporting structure of said device.

13. The system according to claim 4, wherein said surface has the opposite ends that are anchored to a supporting structure of said device.

14. The system according to claim 1, wherein said surface comprises a conveyor belt made of flexible material or else by a deformable plane structure, constituted by elements hinged together.

15. The system according to claim 2, wherein said surface comprises a conveyor belt made of flexible material or else by a deformable plane structure, constituted by elements hinged together.

16. The system according to claim 3, wherein said surface comprises a conveyor belt made of flexible material or else by a deformable plane structure, constituted by elements hinged together.

17. The system according to claim 2, comprising a belt system for driving a synchronized movement of said first and second rollers in said first and second directions, respectively.

18. The system according to claim 3, comprising a belt system for driving a synchronized movement of said first and second rollers in said first and second directions, respectively.

* * * * *